United States Patent [19]

Wenzel

[11] 4,146,199
[45] Mar. 27, 1979

[54] MULTI-WINGED LIFTING BODY AIRCRAFT

[75] Inventor: Harold A. Wenzel, Phoeniz, Ariz.

[73] Assignee: Phoenixbird, Inc., Phoenix, Ariz.

[21] Appl. No.: 820,607

[22] Filed: Aug. 1, 1977

[51] Int. Cl.$^2$ ............................................. B64C 3/06
[52] U.S. Cl. ................................... 244/45 R; 244/36
[58] Field of Search .................. 244/45 R, 36, 13, 15; D12/71, 77

[56] References Cited

U.S. PATENT DOCUMENTS

| | | | |
|---|---|---|---|
| 1,893,129 | 1/1933 | Charpentier | 244/36 X |
| 2,576,294 | 11/1951 | Geraci | 244/45 R X |
| 3,981,460 | 9/1976 | Ratony | 244/45 R X |
| 4,053,125 | 10/1977 | Ratony | 244/45 R X |

*Primary Examiner*—Barry L. Kelmachter

*Attorney, Agent, or Firm*—Cahill, Sutton & Thomas

[57] ABSTRACT

Fore mounted aft swept and aft mounted forward swept wings extend from either side of a lifting body fuselage. Each lateral pair of the wings is joined at the tops by a wing tip vortex translating device to induce translation of the tip generated vortices along the trailing edge of the aft wings. End plates extend rearwardly from the maximum chord thickness of the fuselage to increase the effective lift of the fuselage. An elevator, mounted intermediate the rear top of the end plates, provides pitch control and structurally augments the wing root and fuselage junction of the aft mounted wings. A power plant disposed at the rear of the fuselage provides thrust and also dissipates, as useful thrust, the wing tip vortices translated from the tips to the power plant along the trailing edges of the aft wings.

19 Claims, 9 Drawing Figures

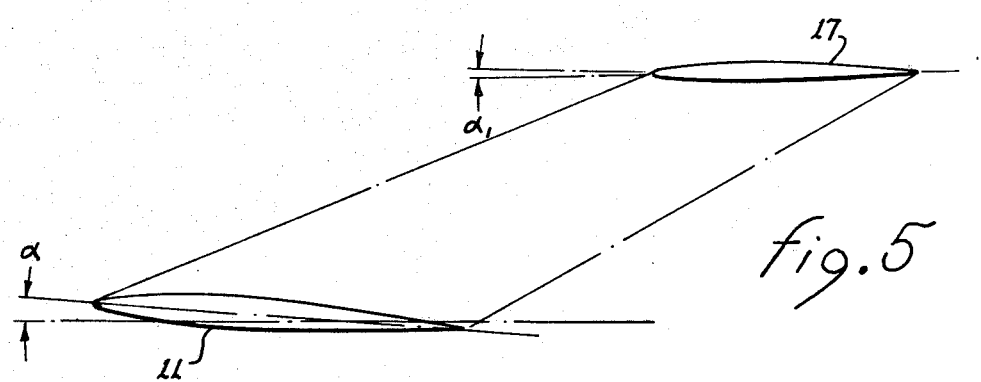
fig.5
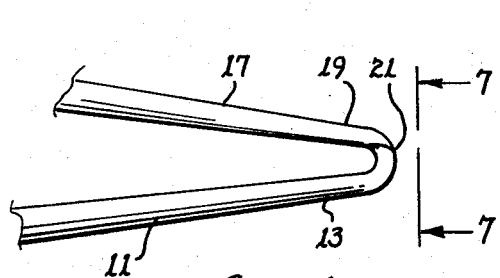
fig.6
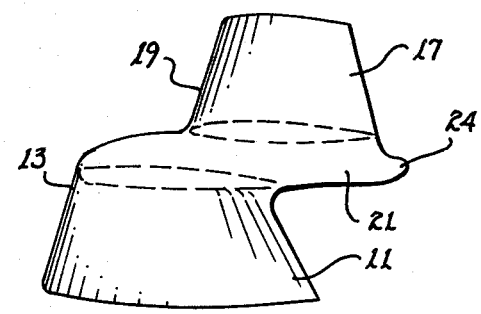
fig.7
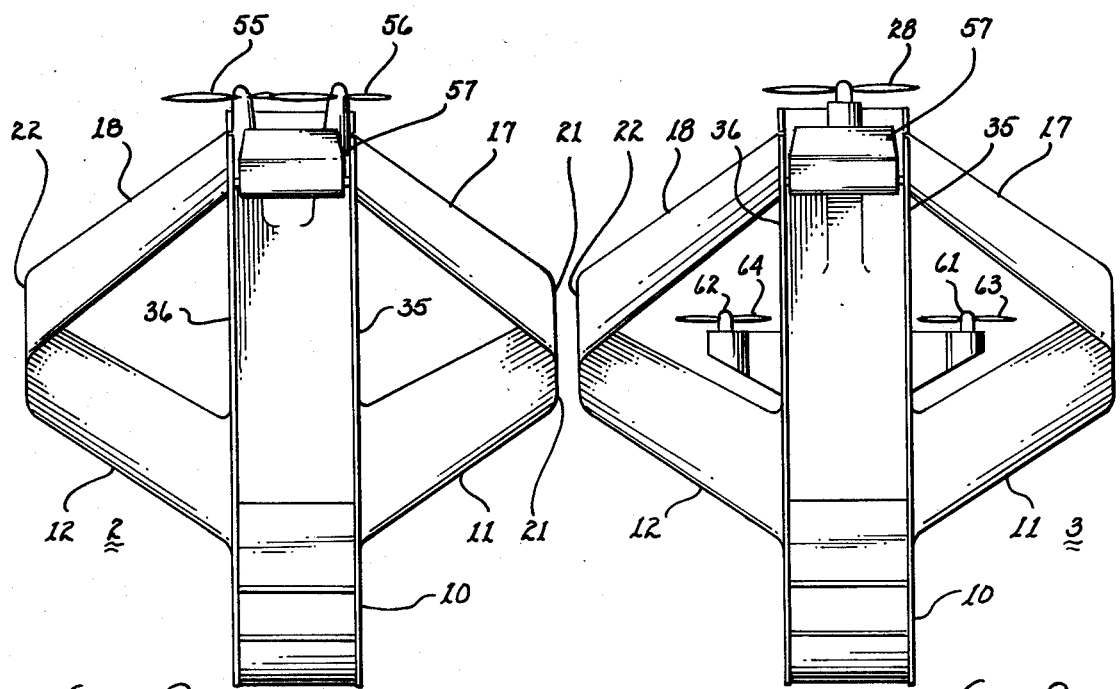
fig.8
fig.9

MULTI-WINGED LIFTING BODY AIRCRAFT

The present invention relates to aircraft and, more particularly, to lifting body aircraft having reverse staggered oppositely swept wings joined at the tips.

For decades, aircraft designers have attempted to develop aircraft wing and fuselage planforms which provide increased thrust, lower drag, lower power requirements, better control and stability of a select combination thereof. For a number of reasons, including lack of financing or poor structural integrity, few nonconventional aircraft designs have never been commercially successful. U.S. Pat. No. 1,246,015, illustrates one of the first attempts by Mr. Curtis to produce an aircraft having an airfoil shaped fuselage for both lift and low drag purposes. In 1933, U.S. Pat. No. 1,893,129, issued illustrating and describing a flying wing having a lifting body central section delineated by rearwardly extending end plates.

U.S. Pat. No. 2,811,323, is directed to an aircraft having a lifting body and stub wings foldably and pivotally storable within the body. U.S. Pat. No. 2,910,254, illustrates a staggered winged aircraft having boundary layer control apparatus.

U.S. Pat. No. 2,913,196, describes a vertical take-off aircraft having end plates attached to an airfoil shaped fuselage.

U.S. Pat. No. 3,834,654, describes a box wing mounted upon a conventional jet fighter aircraft fuselage. The wing tips of the forward rearwardly swept wing is joined to the wing tips of the rearward forwardly swept wing through vertical stabilizers. Other United States patents directed to lifting body or multiple wing planforms include U.S. Pat. No. 3,869,102 (directed to a lifting body cargo aircraft); U.S. Pat. No. 3,942,747 (describing a Canard aircraft having a rearwardly swept forward wing); and U.S. Pat. No. 3,981,460 (describing a staggered channel wing aircraft with reverse staggered wings for improved STOL characteristics).

Other patents generally relating to uniquely shaped or configured aircraft include U.S. Pat. Nos. 1,856,532, 2,294,359 and 2,470,602.

Aside from the above identified patents, other aircraft having non-conventional wing planforms include the Ratony Channel Wing aircraft described in the August 1974 issue of *Air Progress* and the Custer Channel Wing aircraft described in the October 1948 issue of *Popular Science*.

Through engineering studies and experiments conducted with models, it has become apparent that several of the types of aircraft described above fail to meet or exceed the capabilities of conventional aircraft because the improvements were, in part, developed without sufficient regard for the overall aircraft configuration. Moreover, the benefits achievable from a particular element or component were not augmented with or otherwise juxtaposed with other components of the aircraft to obtain a complementary or synergistic benefit. Accordingly, the overall performance suffered.

It is therefore a primary object of the present invention to provide an integrated aircraft configuration for the lift generating elements, the control elements, the power plant and the load carrying elements.

Another object of the present invention is to provide a low induced drag wing planform for aircraft.

Yet another object of the present invention is to provide wing tip vortex translating elements for tip interlocked biwing aircraft.

Still another object of the present invention is to provide a lifting body fuselage for an aircraft which aerodynamically and structurally complements the wing planform.

A further object of the present invention is to provide a rearwardly located aircraft power plant which dissipates wing tip vortices translated along the trailing edge of the rear wing of a biwing aircraft.

A yet further object of the present invention is to provide fuselage end plates which augment the lift generating capability of both the fuselage and provide structural support for the wing.

A still further object of the present invention is to provide a rearwardly swept forwardly mounted dihedralled wing having the tips joined to the tips of a forwardly swept rearwardly mounted anhedralled wing at a common junction point.

These and other objects of the present invention will become apparent to those skilled in the art as the description thereof proceeds.

The present invention may be described with greater specificity and clarity with reference to the following drawings, in which:

FIG. 5 is a cross-sectional view of the reverse staggered wings;

FIG. 6 is a partial view illustrating the wing tip junction variant;

FIG. 7 is an end view, taken along lines 7—7, as illustrated in FIG. 6;

FIG. 8 illustrates a variant of the power plant configuration; and

FIG. 9 illustrates a further variant of the power plant configuration.

Figure 1:
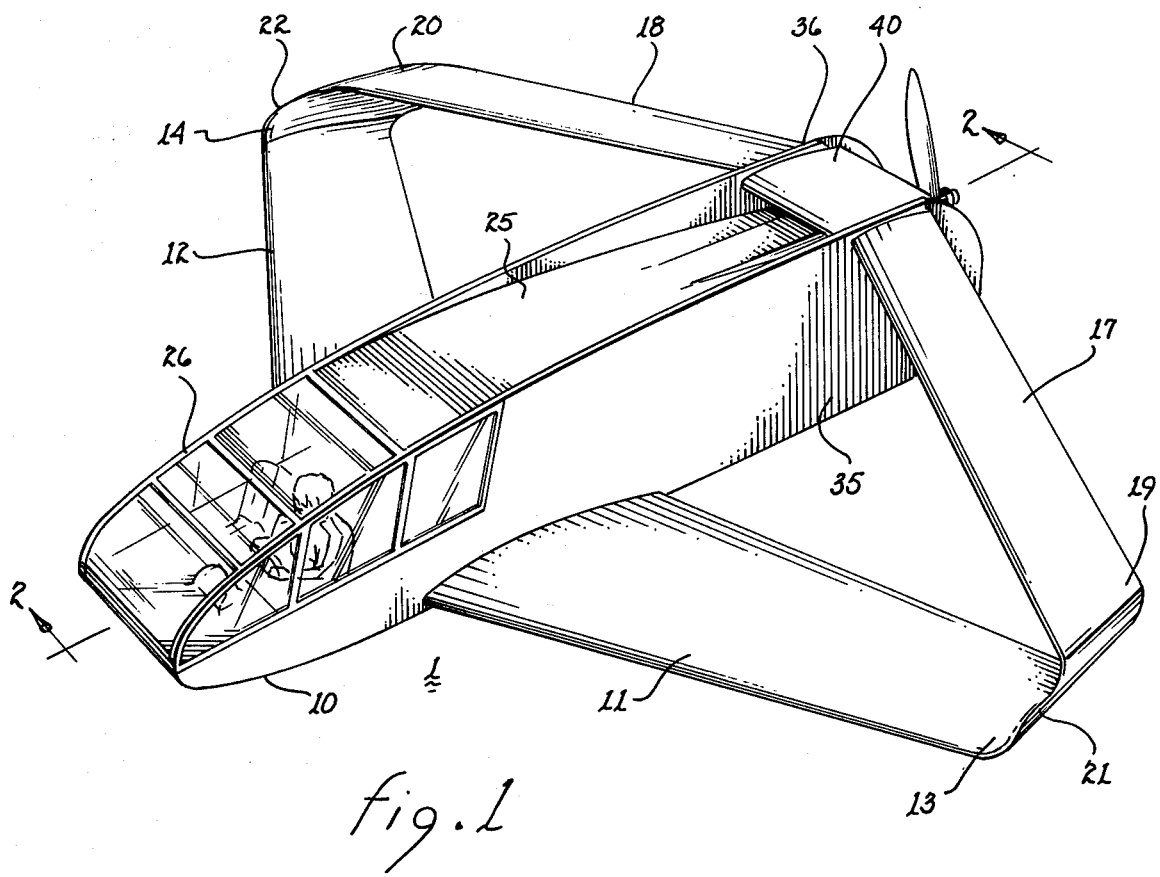
FIG. 1 is a perspective view of the invention.

Referring to FIG. 1, there is illustrated an aircraft 1 having a lifting body fuselage 10. Forwardly mounted rearwardly swept wings 11 and 12 extend laterally from a lower part of fuselage 10. Because of the dihedral of wings 11 and 12, tips 13 and 14 are vertically raised above the roots of their respective wings. A second set of rearwardly mounted forwardly swept wings 17 and 18 are secured to the upper rear part of fuselage 10. Wings 17 and 18 have anhedral such that tips 19 and 20 are vertically lower than the wing roots and in vertical proximity with tips 13 and 14. The degree of forward sweep of wings 17 and 18, commensurate with their point of attachment to fuselage 10, is such that tips 19 and 20 overlap, to greater or lesser degree, tips 13 and 14.

Tips 13 and 19 are joined to one another through a vortex translating device 21; similarly, tips 14 and 20 are joined to one another through a vortex translating device 22. These devices are elements curved about the horizontal axis in the manner of a cylindrical section. Through such curvature they tend to translate the wing tip vortex flow created at tips 13 and 14 upwardly to wing tips 19 and 20. Because of the forward sweep of wings 17 and 18, the vortices tend to translate along the trailing edges of the wings to the aft portion of fuselage 10.

Figure 2:
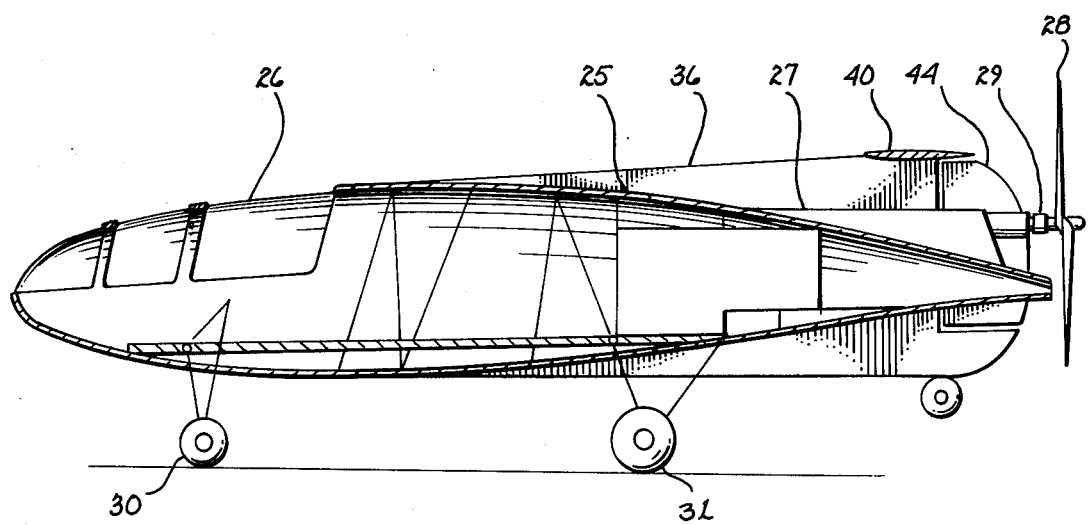
FIG. 2 is a cross-sectional view taken along lines 2—2, as shown in FIG. 1.
Figure 3:
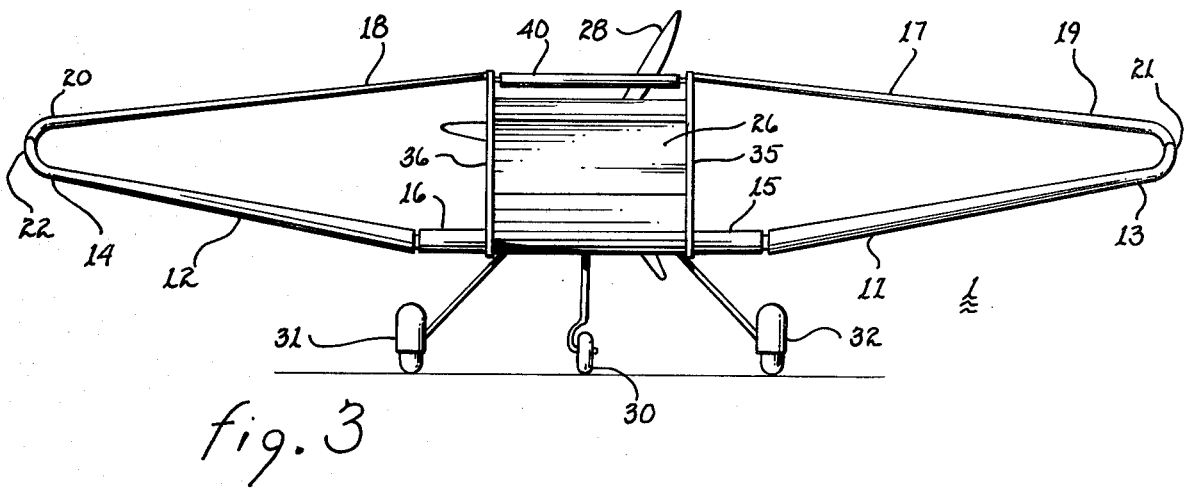
FIG. 3 is a front view of the aircraft illustrated in FIG. 1.

Fuselage 10, as illustrated with joint reference to FIGS. 1, 2 and 3, includes an airfoil-shaped body 25. This body encloses the cockpit 26, cargo space, fuel, the control system, supports the undercarriage, and includes wheel wells for retractable versions of the aircraft. Miscellaneous other necessary structural members and equipment are also housed in the fuselage. Furthermore, body 25 supports rearwardly mounted power plant 27. Although the power plant is illustrated as driving a propeller 28 through a shaft 29, a jet engine or other propulsion system may be used. The undercarriage may include a nose wheel 30 and a pair of main wheels 31 and 32.

The sides of body 25 are planar and defined by end plates 35 and 36. The perimeter of the end plates is commensurate with the outline of body 25 forward of the maximum chord thickness of the body. However, rearwardly of the maximum chord thickness, the upper and lower edges of the end plates extend directly rearwardly in a straight line, or, as illustrated in FIG. 2, the upper edge may extend slightly upwardly. Aerodynamically, end plates 35 and 36 tend to increase the lift coefficient and the effective aspect ratio of the airfoil section represented by body 25 and thereby reduce the induced drag. Additionally, the end plates tend to reduce transverse flow across the airfoil section and thereby reduce the curling or vortex-like air flow path lateral to the body with the overall effect being that of reducing drag of the body.

Structurally, end plates 35 and 36 provide a means for attaching the roots of wings 17 and 18 to the body at a point vertically displaced from the fuselage junction of wings 11 and 12. A horizontal stabilizer 40, which may be of the full flying type as illustrated, is mounted intermediate end plates 35 and 36 in general alignment with the roots of wings 17 and 18. End plates 35 and 36 also serve an aerodynamic function as vertical stabilizers. Accordingly, rudders 44 and 45 are developed at the rear of the end plates.

Roll control for aircraft 1 is achieved through ailerons and/or selectively actuated lift reducing elements, such as spoilers, located outward of fuselage 10. Flaps may be included for glide path control and to develop increased lift at low speed. Moreover, the flaps and ailerons may be interconnected in a manner common to high performance sailplanes or flaperons may be employed.

FIG. 3 illustrates a frontal view of aircraft 1. As illustrated, wings 11 and 14 may optionally include stub sections 15 and 16 disposed at the wing roots. The dihedral of wings 11 and 12 is depicted to illustrate the juxtaposed relationship of tips 13 and 19 and tips 14 and 20. The curvature of devices 21 and 22 is radiused to match the vertical separation intermediate the tips and to optimize non-separation of the normally occurring vortices at tips 13 and 14. Through such optimization, channeling of at least the major part of the vortex flow to the trailing edges of wings 17 and 18 will occur. Because of the forward sweep of wings 17 and 18, translation of the vortex flow along the trailing edges of the wings to the root will occur. At the root, the lateral airflow will separate from the trailing edge and flow into the inflowing air stream to propeller 28. By this controlled discharge of the wing tip vortices, the drag normally associated therewith is substantially reduced, resulting in a more efficient operation of the wings of aircraft 1. Additionally, the energy contained in the separating vortex flow will augment the thrust of the propeller and permit greater speed with less power.

Figure 4:
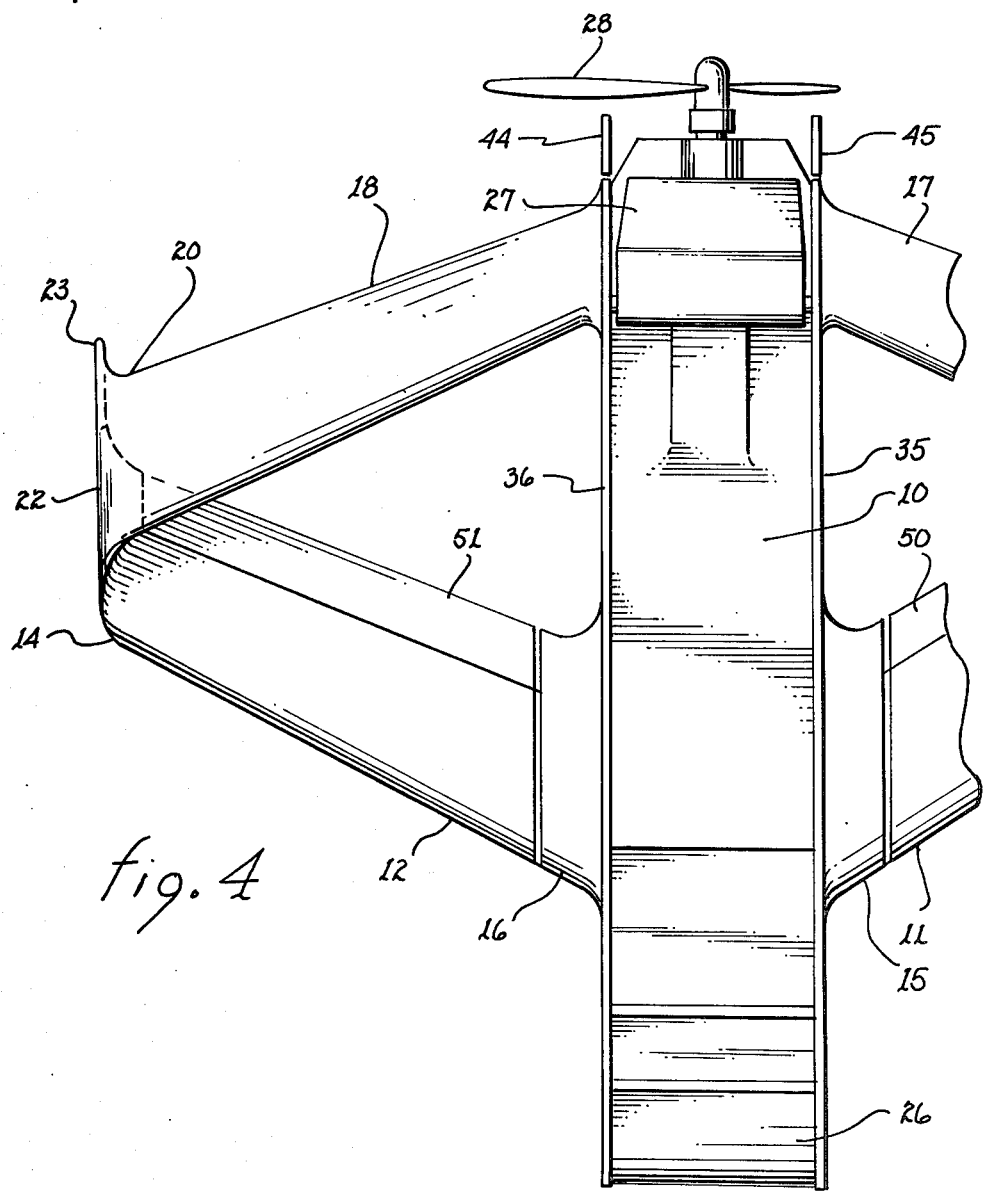
FIG. 4 is a partial plan view of the aircraft.

The planform of the wings is illustrated in further detail in FIG. 4. The forwardly mounted rearwardly swept wings 11 and 14 are tapered toward their respective tips. The stub sections are well faired into the respective end plates to minimize drag at the wing/fuselage junction. As illustrated, flaperons 50, 51 may extend along the trailing edge of wings 11 and 12; or, in the alternative, they may be split into independent interconnected or non-interconnected ailerons and flaps. Similar or related roll control elements may be disposed on wings 17 and 18.

The vortex translating device 22 may be simply a curved element extending intermediate the leading and trailing edges of wing 12 to the leading and trailing edges of wing 18 or the device may include a rearwardly extending tip section 23. In the latter case, the function of the tip section is that of providing a means for dissipating with minimum energy loss that portion of a wing tip vortex which cannot be effectively translated along the trailing edge of the wings into the airstream of propeller 28. As illustrated, wings 17 and 18 may also taper from their respective tips toward fuselage 10.

As is well documented in the prior art, a box wing is a more efficient lift generating element than that of a conventional single wing. By incorporating the vortex translating devices as illustrated and described herein, the drag and multiple vortices developed by the previously employed tip interconnecting planar vertical plates has been obviated. Thus, the dihedral/anhedral wing configuration of the present invention results in a wing having less induced drag and thereby renders the wing more efficient.

One of the primary appeals of a biplane is that of achieving substantial wing area while maintaining a relatively small wing span. Such a configuration provides high maneuverability and reduces certain ground handling problems. Additionally, since two independent wings are employed, their respective angles of attack may be different whereby one wing will always stall before the other wing. Thereby, violent abrupt stalls are precludable resulting in a more safe aircraft at low speed or during abrupt maneuvering.

With the wing planform illustrated for aircraft 1, the angle of of attack, $\alpha$, of the rearwardly swept wing 11 (see FIG. 5) may be placed at a higher angle of attack $\alpha_1$ than the forwardly swept wing 17. With such an arrangement, the rearwardly swept wing will stall prior to stall of the forwardly swept wing. And, self correcting stability, as well as control of the aircraft, is substantially enhanced. Because of the lifting body fuselage configuration, the fuselage can be set at an angle of attack different from that of the rearwardly and forwardly swept wings. With such a configuration of the three lift generating elements of aircraft 1, one of the three lift generating elements will always stall prior to the other two. This will result in an easily detectable mushing of the aircraft, rather than a complete stall and possible spin. Accordingly, loss of control of the aircraft due to a stall should never occur.

Referring jointly to FIGS. 6 and 7, there is shown a variant of vortex translating device 21. In this variant, tips 13 and 19 are laterally displaced from one another such that they only partially overlap one another. To accommodate such an overlap, vortex translating device 21 is configured to resemble a semi-cylindrical element with tip 13 being secured to the forward end of one longitudinal edge and tip 19 secured to the rear end of the other longitudinal edge of the cylindrical element. A rearward extension 24 may be incorporated in vortex translating device 21 to aid in dissipating with minimum drag losses that portion of a wing tip induced vortex which cannot be translated to and along the trailing edge of wing 17.

FIG. 8 illustrates a variant 2 of the present invention incorporating a pair of thrust generating propellers 55 and 56. These propellers may be powered from a conventional single or dual power plant 57, such as a reciprocating engine, or the like.

FIG. 9 illustrates a variant 3 incorporating a single propeller 28 and power plant 57 disposed at the rear of fuselage 10 and two auxiliary power plants 61 and 62. The auxiliary power plants extend laterally from tip plates 35 and 36. In the vertical axis, these power plants are disposed intermediate the fuselage junction of the rearwardly swept and forwardly swept wings. In the horizontal axis, the thrust generating elements, such as propellers 63 and 64 are disposed intermediate the chord center lines of the rearwardly swept and forwardly swept wings.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A multiwing lifting body aircraft, said aircraft comprising in combination:
   a. a lifting body fuselage for generating lift;
   b. end plates disposed along lateral sides of said fuselage for increasing the lift generating capability of said fuselage;
   c. a forwardly mounted dihedralled rearwardly swept wing for generating lift, said rearwardly swept wing being secured to the lower part of said fuselage;
   d. a rearwardly mounted anhedralled forwardly swept wing for generating lift, said forwardly swept wing being secured to the upper part of said end plates;
   e. a tip vortex translating device disposed intermediate and interconnecting each tip of said rearwardly swept wing with the corresponding tip of said forwardly swept wing for translating vortex flow to the trailing edge of said forwardly swept wing, each said tip vortex translating device being non-planar and curved about an axis parallel to the longitudinal axis of said fuselage; and
   f. thrust generating means mounted at the rear of said fuselage in proximity to the root of said forwardly swept wing for providing thrust;
   whereby, said aircraft wings and fuselage form three discrete lift generating elements and the induced drag due to wing tip vortices is reduced by each said vortex translating device.

2. The aircraft as set forth in claim 1 wherein said forwardly swept wing includes two separate mirror image wings, each of said mirror image wings having its root secured to one of said end plates.

3. The aircraft as set forth in claim 2 including a horizontal stabilizer mounted intermediate said end plates in general alignment with the roots of said mirror image wings forming a part of said forwardly swept wing.

4. The aircraft as set forth in claim 3 wherein the tip of said forwardly swept wing at least partially horizontally overlaps the corresponding tips of said rearwardly swept wing.

5. The aircraft as set forth in claim 4 wherein the tips of said forwardly swept wing fully horizontally overlaps the corresponding tips of said rearwardly swept wing.

6. The aircraft as set forth in claim 5 wherein each of said translating devices comprise a partial cylindrical section.

7. The aircraft as set forth in claim 6 wherein each of said translating devices includes a rearwardly extending tip section.

8. The aircraft as set forth in claim 4 wherein each of said translating devices comprise a partial cylindrical section.

9. The aircraft as set forth in claim 8 wherein each of said translating devices includes a rearwardly extending tip section.

10. The aircraft as set forth in claim 4 wherein said fuselage is airfoil shaped.

11. The aircraft as set forth in claim 10 wherein said end plates extend above said fuselage rearwardly of the maximum chord thickness of said fuselage.

12. The aircraft as set forth in claim 11 wherein each of said rearwardly swept wing, said forwardly swept wing and said fuselage is at a different angle of attack.

13. The aircraft as set forth in claim 3 wherein said rearwardly swept wing is tapered from the root to the tip and said forwardly swept wing is tapered from the tip to the root.

14. The aircraft as set forth in claim 13 including roll and glide path control elements developed within at least said rearwardly swept wing.

15. A multiwing aircraft, said aircraft comprising in combination:
   a. a fuselage having a longitudinal axis;
   b. a forwardly mounted dihedralled rearwardly swept wing secured to the lower part of said fuselage;
   c. a rearwardly mounted anhedralled forwardly swept wing secured to the upper part of said fuselage;
   d. means for securing said forwardly swept wing to said fuselage;
   e. a tip vortex translating device securing each tip of said rearwardly swept wing to the corresponding tip of said forwardly swept wing for translating vortex flow from the trailing edge of said rearwardly swept wing to the trailing edge of said forwardly swept wing, said tip vortex translating device being a curved element generally C-shaped in lateral cross-section and curved about an axis parallel to the longitudinal axis of said fuselage; and
   f. means for controlling said aircraft in the pitch, roll and yaw axis;
   whereby, the drag of said rearwardly swept wing is reduced by the translation therefrom of the tip vortices.

16. The aircraft as set forth in claim 15 wherein said fuselage is a lifting body.

17. The aircraft as set forth in claim 16 wherein said securing means comprises end plates extending from said lifting body.

18. The aircraft as set forth in claim 15 wherein the tips of said rearwardly swept wing at least partially overlap the corresponding tips of said forwardly swept wing.

19. The aircraft as set forth in claim 15 including means for developing thrust to propel said aircraft.

* * * * *